J. G. OLIVER & G. C. BARDONS.
AUTOMATIC STOP MECHANISM FOR TURRET LATHES.
APPLICATION FILED FEB. 19, 1916.
1,224,955.
Patented May 8, 1917.
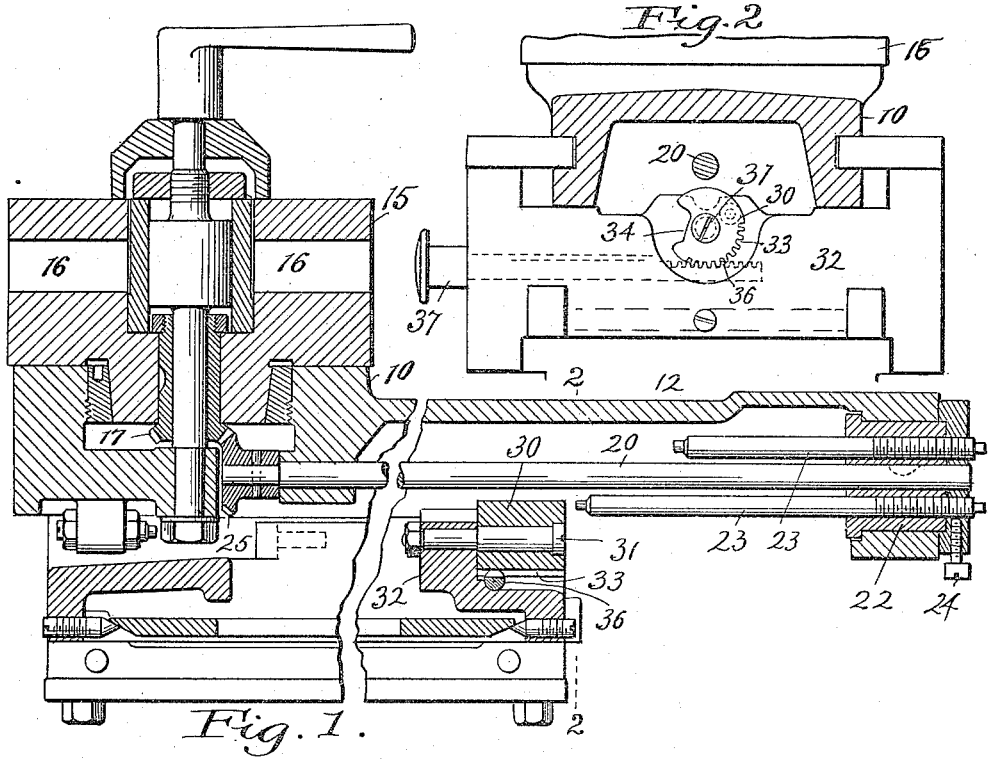
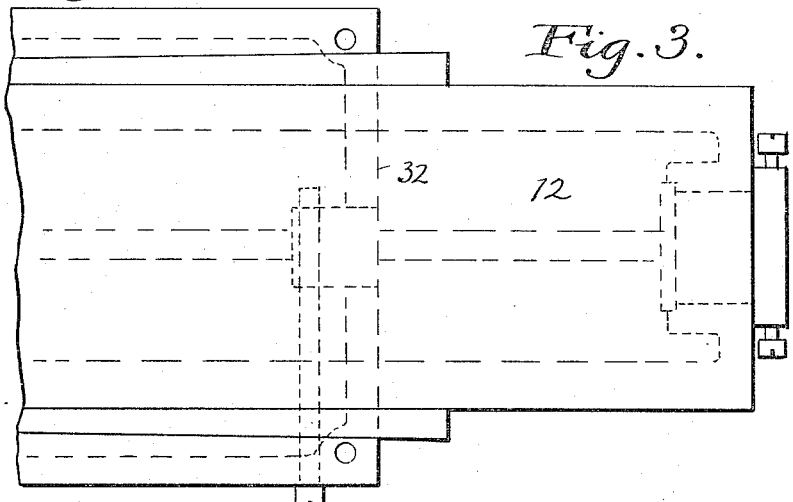
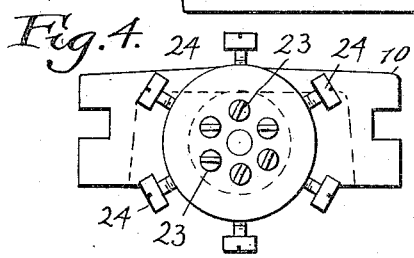

UNITED STATES PATENT OFFICE.

JOHN G. OLIVER AND GEORGE C. BARDONS, OF CLEVELAND, OHIO.

AUTOMATIC STOP MECHANISM FOR TURRET-LATHES.

1,224,955.     Specification of Letters Patent.     Patented May 8, 1917.

Application filed February 19, 1916. Serial No. 79,233.

*To all whom it may concern:*

Be it known that we, JOHN G. OLIVER and GEORGE C. BARDONS, citizens of the United States, and residents of Cleveland, in the county of Cuyahoga and State of Ohio, have invented a certain new and useful Improvement in Automatic Stop Mechanism for Turret-Lathes, of which the following is a full, clear, and exact description.

The object of this invention is to enable the operator of a turret lathe, which is provided with automatic stop mechanism, to quickly render said stop mechanism operative or inoperative whenever desired.

The invention consists in the construction and combination of parts shown in the drawings and hereinafter described and pointed out definitely in the appended claim.

In the drawings, Figure 1 is a sectional side elevation of so much of a turret lathe which is equipped with the present invention as is necessary to understand the same. Fig. 2 is a sectional end view in the plane indicated by line 2—2 on Fig. 1; Fig. 3 is a plan view of the rear end of the bed of such a turret lathe. Fig. 4 is a rear view of the machine.

Referring to the parts by numerals, 10 represents the slide of a turret lathe which is to be mounted upon the bed 12 in any suitable way. 15 represents the turret which is rotatably supported upon said slide.

20 represents the automatic stop shaft which is rotatably mounted on the under side of the slide. A stop bar sleeve 22 is fixed to the rear end of this shaft, and this has through it a plurality of holes, (as many as there are tool sockets 16 on the turret), which holes are parallel with the shaft. Stop bars 23 go through these holes and are secured therein in any desired position by set screws 24. The other end of the stop shaft has fixed to it a beveled gear 25 which meshes with a bevel gear 17 fixed to the turret. These meshing bevel gears are of the same size, and thereby, as the turret is turned, the stop shaft is turned through a like arcual distance, with the result that when any particular tool socket is brought into working position, the corresponding stop bar will be brought into operative position, which is the position directly under the stop shaft. All of the above described parts are well known parts of turret lathes, and therefore need no further description.

30 represents a stop block. This is rotatable upon the spindle 31 by means of which it is fixed to the frame member 32 of the machine. This stop block is placed in such position that a part thereof above the spindle 31 is in alinement with that one of the stop bars which is in the operative position. Therefore, when the turret slide is moving in the direction which carries the tool along the work, the operative, *i. e.* lower, stop bar will be brought into contact with this stop bar, with the result that the turret slide will be stopped by the mechanism ordinarily provided for that purpose.

The stop block 30, however, is provided throughout a part of its periphery with gear teeth 33. Associated with this is a rack bar 36 which is slidable horizontally from front to rear of the machine, and its teeth engage the teeth on the stop block. The front end of this rack bar which projects at the front of the machine is provided with a convenient knob 37 by which the operator may move it in or out. When it has been pushed in the part of the stop block above its axis is alined with the operative stop bar as stated.

But a portion of the periphery of this stop block is cut away from end to end, thereby forming a peripheral recess 34. When the rack bar is pulled out, the stop block is turned so as to bring this recess into alinement with the operative stop bar. Under these conditions, when the slide 10 is moving to carry the tool along the work, the stop bar in operative position will not engage the stop block, but will slip through the recess 34 therein; wherefore the slide will continue to move until stopped by some other means than the stop block, to wit, the means ordinarily provided in a turret lathe for stopping the slide when desired.

Having described our invention, we claim:

In a turret lathe, having a rotatable turret, the combination with a rotatable stop sleeve, intermediate mechanism for causing said turret and sleeve to turn simultaneously and equally, and a plurality of stop bars adjustably secured to said stop sleeve, of a rotatable stop block supported by the frame of the machine and having peripheral gear teeth and having a recess cut in it from end to end, and an endwise movable rack bar which engages the peripheral teeth on said stop bar whereby through the endwise movement of the rack bar this stop block may be turned to bring its recess into alinement with the operative stop bar or to bring an unrecessed part of said stop block into alinement with said stop bar.

In testimony whereof, we hereunto affix our signatures in the presence of two witnesses.

JOHN G. OLIVER.
GEORGE C. BARDONS.

Witnesses:
M. J. LLOYD,
H. W. GEORGE.

Copies of this patent may be obtained for five cents each, by addressing the "Commissioner of Patents, Washington, D. C."